United States Patent
Gupta et al.

(10) Patent No.: US 11,133,989 B2
(45) Date of Patent: Sep. 28, 2021

(54) AUTOMATED REMEDIATION AND REPAIR FOR NETWORKED ENVIRONMENTS

(71) Applicant: Shoreline Software, Inc., Redwood City, CA (US)

(72) Inventors: Anurag Gupta, Atherton, CA (US); Charles Ian Ormsby Cary, Redwood City, CA (US)

(73) Assignee: Shoreline Software, Inc., Redwood City, CA (US)

( * ) Notice: Subject to any disclaimer, the term of this patent is extended or adjusted under 35 U.S.C. 154(b) by 17 days.

(21) Appl. No.: 16/723,885

(22) Filed: Dec. 20, 2019

(65) Prior Publication Data

US 2021/0194773 A1    Jun. 24, 2021

(51) Int. Cl.
*H04L 29/08* (2006.01)
*H04L 12/24* (2006.01)
*H04L 12/26* (2006.01)

(52) U.S. Cl.
CPC .......... *H04L 41/12* (2013.01); *H04L 41/0876* (2013.01); *H04L 41/0893* (2013.01); *H04L 43/08* (2013.01); *H04L 67/10* (2013.01)

(58) Field of Classification Search
CPC . H04L 41/12; H04L 41/0876; H04L 41/0893; H04L 43/08; H04L 67/10
See application file for complete search history.

(56) References Cited

U.S. PATENT DOCUMENTS

| | | | |
|---|---|---|---|
| 7,093,088 B1 | 8/2006 | Todd et al. | |
| 7,469,284 B1 | 12/2008 | Dubrovsky et al. | |
| 8,930,954 B2 * | 1/2015 | Hildrum | G06F 9/5038 718/104 |
| 9,875,235 B1 * | 1/2018 | Das | G06F 40/205 |
| 10,108,458 B2 * | 10/2018 | Chen | G06F 9/4881 |

(Continued)

OTHER PUBLICATIONS

Gupta, Anurag et al., "Executing a Pipeline Command Sequence Designed For Execution on a Single Node across a Fleet of Nodes," U.S. Appl. No. 16/696,626, filed Nov. 26, 2019, Specification, Claims, Abstract, and Drawings, 36 pages.

(Continued)

*Primary Examiner* — Viet D Vu
(74) *Attorney, Agent, or Firm* — Carr & Ferrell LLP

(57) ABSTRACT

Described are methods and systems for automated remediation for networked environments. An example method includes receiving a definition of actions associated with each remediation of issues for a network fleet. The method can further include automatically converting each definition into automated flows in a pipeline language for execution across the network; automatically determining that there is variance between an observed state of the network fleet and a desired state of the network fleet that is causing at least one issue in the network; automatically executing the automated flows to take actions for automatically remediating the variance across the entire network fleet; and receiving feedback after the automatic execution. The automated flows may include flows for alerting and for taking one or more actions across the entire network fleet. The example method further includes, based on the feedback indicating further variance, automatically repeating the automatically determining and automatically executing steps.

20 Claims, 4 Drawing Sheets

(56) References Cited

U.S. PATENT DOCUMENTS

| | | |
|---|---|---|
| 10,713,280 B2 | 7/2020 | Horowitz et al. |
| 11,036,560 B1 | 6/2021 | Mcpherson et al. |
| 2005/0038890 A1 | 2/2005 | Masuda et al. |
| 2006/0090165 A1 | 4/2006 | Martin et al. |
| 2014/0215077 A1* | 7/2014 | Soudan ................ H04L 47/822 709/226 |
| 2015/0095917 A1 | 4/2015 | Challenger et al. |
| 2015/0160966 A1 | 6/2015 | Archer et al. |
| 2017/0279703 A1 | 9/2017 | Wasmundt et al. |
| 2017/0310542 A1* | 10/2017 | Nair .................... H04L 41/0816 |
| 2017/0329648 A1 | 11/2017 | Ren et al. |
| 2017/0371968 A1 | 12/2017 | Horowitz et al. |
| 2019/0196672 A1 | 6/2019 | Mikheev |
| 2020/0050487 A1 | 2/2020 | Garla et al. |
| 2020/0117434 A1 | 4/2020 | Biskup et al. |
| 2020/0174840 A1* | 6/2020 | Zhao ..................... G06N 3/084 |
| 2021/0149678 A1 | 5/2021 | Gupta et al. |
| 2021/0157630 A1 | 5/2021 | Gupta et al. |

OTHER PUBLICATIONS

Gupta, Anurag et al., "Executing a Pipeline Command Sequence Designed For Execution on a Single Node across a Fleet of Nodes," U.S. Appl. No. 16/684,001, filed Nov. 14, 2019, Specification, Claims, Abstract, and Drawings, 36 pages.

* cited by examiner

AUTOMATED REMEDIATION AND REPAIR FOR NETWORKED ENVIRONMENTS

TECHNICAL FIELD

The present technology relates generally to networked environments, and more particularly, but not by limitation, to automated remediation and repair of issues that arise in networked environments.

BACKGROUND

Customers using network environments having networked systems and services expect their systems/services to be running and perform consistently. Jitter, downtime, and even maintenance windows in performance are no longer acceptable. Customers run their systems around the clock and expect them to run without any interruptions or performance loss.

Additionally, network environments are becoming more complex. Currently, an individual operator is responsible for multiple machines, required to understand many different services, be fluent with both multiple cloud and on-premises environments, and operate in a rapidly changing environment. Existing tools are inadequate for ever increasing network and server administration needs. For example, existing tools for monitoring and ticket administration require a human to review dashboards and manually process ticket queues, even for repetitive issues.

In addition, manual decision making by operators can introduce errors. There may also be a considerable lag from when an issue in the network environment is first observed to when a control action is applied in an attempt to remedy the issue. Furthermore, there is typically infrequent actions from operators until an issue becomes pervasive which can lead to large course corrections. Operators acting manually may not anticipate issues that might arise in a particular configuration. Instead, control actions might be taken only after the system becomes substantially impaired. In addition, corrections performed manually may only happen per-instance even though the issue may occur fleetwide.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

According to an example embodiment, a method for performing automated remediation for networked environments is provided. The method may include receiving one or more definition of actions associated with each remediation of a plurality of issues for at least one device in a network fleet; automatically converting each definition of the one or more definitions of the actions associated with each remediation into automated flows in a pipeline language for pipelined execution across the network. In some embodiments, the definition of actions comprises an existing run book. In other embodiments, existing run books are not utilized so instead of converting existing run books to pipelined command steps in a pipeline language, the pipeline command steps are created in the pipeline language for the procedures in lieu of run books.

The method may also include automatically monitoring systems within the network; automatically determining based on the monitoring that there is variance between an observed state of the network fleet and a desired state of the network fleet that is causing at least one issue, of the plurality of issues, in the network; and automatically executing the automated flows to automatically remediate the variance by other than human operator means, wherein the automated flows include flows for alerting and for taking one or more actions across the entire network fleet. The method may also include after the automatically executing, receiving feedback from automatically monitoring the network fleet after the taking of the one or more actions; and repeating the automatically determining and automatically executing steps when the received feedback indicates further variance.

According to an example embodiment, a system for performing automated remediation for networked environments is provided. The system may include a processor; and a memory, the processor executing instructions stored in the memory to: receive the one or more definition of actions associated with each remediation of a plurality of issues for at least one device in a network fleet, e.g., receive from a customer; automatically convert each definition of the one or more definitions of the actions associated with each remediation into automated flows in a pipeline language for pipelined execution across the network; automatically monitor systems within the network; automatically determine based on the monitoring that there is variance between an observed state of the network fleet and a desired state of the network fleet that is causing at least one issue, of the plurality of issues in the network; and automatically execute the automated flows to automatically remediate the variance by other than human operator means, wherein the automated flows include flows for: alerting; and taking one or more actions across the entire network fleet.

The processor may also execute instructions stored in the memory to automatically convert each definition of the one or more definitions of the actions associated with each remediation into automated flows in a pipeline language for pipelined execution across the network; automatically monitor systems within the network; automatically determine based on the monitoring that there is variance between an observed state of the network fleet and a desired state of the network fleet that is causing at least one issue, of the plurality of issues, in the network; automatically execute the automated flows to automatically remediate the variance by other than human operator means, wherein the automated flows include flows for: alerting; and taking one or more actions across the entire network fleet. Instructions may also be included to, after the automatically execute, receive feedback from automatically monitoring the network fleet after the taking of the one or more actions; and automatically repeat the automatically determine and automatically execute steps when the received feedback indicates further variance.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
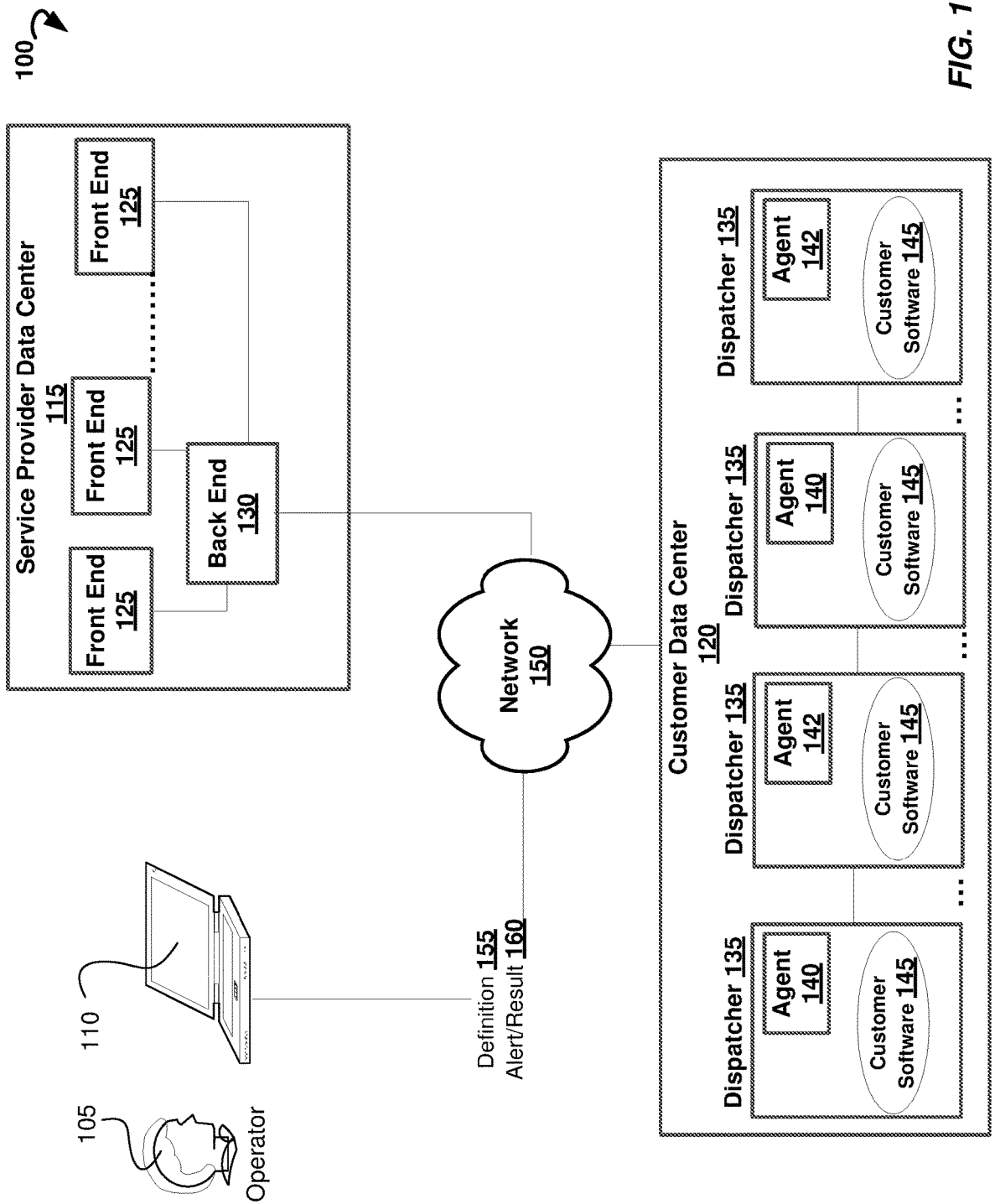
FIG. 1 is a high-level schematic diagram of an exemplary computing architecture of a computing environment for implementing systems and methods for the present technology.

The following detailed description of embodiments includes references to the accompanying drawings, which form a part of the detailed description. Approaches described in this section are not prior art to the claims and are not admitted prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The present disclosure is directed to various embodiments of systems and methods for automated remediation and repair of issues for a networked environment. The systems and methods may allow automating control, provide quick reaction time, allow taking continuous actions and adjusting subsequent actions based on a feedback from the actions already taken, as well as allow taking proactive actions before a system is impaired and scaling operations to a fleet size. The disclosed systems and methods may free up and reduce fatigue of human operators resulting from performing tedious and repetitive tasks. In some embodiments, remediation includes repair as part of the remedy so the term remediation may be used by itself herein.

The systems and methods of the present disclosure can facilitate the process of automated remediation (a measure-alert-act loop). According to some embodiments, the method includes receiving one or more definition of actions associated with each remediation of a plurality of issues for at least one device in a network fleet; and automatically converting each definition of the one or more definitions of the actions associated with each remediation into automated flows in a pipeline language for pipelined execution across the network. The system can handle converting the definitions of action to one or more fleet-wide parallel, distributed, fault-tolerant, event-driven, scalable, secure, and automated flows. (Further details and examples concerning fault-tolerant pipeline command sequence execution can be found in U.S. patent application Ser. No. 16/684,001, filed Nov. 14, 2019 entitled "Fault-tolerant execution of command pipeline steps", which is incorporated by reference herein in its entirety.) Once converted, the flows can be run across thousands or millions of managed resources. This approach can be used to monitor customer systems against desired behavior and take actions in response to detected anomalies. This approach can also allow handling various failures, missing network messages, out of order delivery, changing definitions, additions/removals of parts of the fleet, and so forth. In some embodiments, this handling is done proactively by preventing issues based on a rate of metric change in normal behavior before these issues arise.

One or more pipeline steps can be used to create an execution plan for the flow(s). Upon creation of the execution plan, resources available to the customer for the execution plan can be ascertained. The execution of the execution plan may be managed through agents associated with available resources. According to various example embodiments, an agent is a software that runs on a resource associated with the customer (e.g., a customer computer or a cloud resource), collectively referred to as agents. A subset of agents that can directly communicate with the system for a fault-tolerant execution of command pipeline steps is referred to herein as dispatchers. Only the agents that act as dispatchers can be allowed to communicate with the system for reasons such as security because the customers may not want to have all of their resources/nodes/computers to directly communicate with resources/nodes/computers outside of a data center/computing environment of the customers.

Referring now to the drawings, FIG. 1 is a high-level schematic diagram of an exemplary computing architecture (hereinafter referred to as architecture 100) of a computing environment for implementing systems and methods for various embodiments of the present technology. The architecture 100 can include an operator 105, a computing device 110 associated with the operator 105, a service provider data center 115, a customer data center 120, and a network 150. The service provider data center 115 may include a plurality of front ends 125 (including front end nodes) and a back end 130 (including back end nodes). In an example embodiment, the service provider data center 115 may act as a system for the automated remediation and repair of issues. In some embodiments, the system for automated remediation and repair of issues may include a server or cloud-based computing device configured to specifically perform the operations described herein. The system for automated remediation and repair of issues can also include a plurality of distributed computing systems that cooperatively provide the features of the system. For example, individual systems of the plurality of distributed computing systems can provide one or more unique functions or services. In some embodiments, the system for automated remediation and repair of issues can comprise a cloud computing environment or other similar networked computing system.

The customer data center 120 may include a plurality of agents 140 and 142 of customer software 145. Some of agents, e.g., agents 140, may act as dispatchers 135 and communicate with the back end 130 of the service provider data center 115. Each of the computing device 110, the service provider data center 115, and the customer data center 120 may communicate with each other via the network 150.

The network 150 may include the Internet, a computing cloud, Representational State Transfer services cloud, and any other network capable of communicating data between devices. Suitable networks may include or interface with any one or more of, for instance, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Limited duplex paging network, Bluetooth radio, or an IEEE 802.11-based radio frequency network. The network 150 can further include or interface with any one or more of Recommended Standard 232 (RS-232) serial connection, an IEEE-1394 (FireWire) connection, a Fiber Channel connection, an IrDA (infrared) port, a Small Computer Systems Interface connection, a Universal Serial Bus connection or other wired or wireless, digital or analog interface or connection, mesh or Digi® networking. The network 150 may include a network of data processing nodes, also referred to as network nodes, that are interconnected for the purpose of data communication.

When the operator 105 provides a definition 155, the definition 155 may be received by one of front ends 125. As described further below, the definition may be from a run book provide by a customer normally used for manual remediation, the run book including a detailed description of the actions assigned to each remediation. For example, the runbook may be a compilation of routine procedures and operations that the system administrator or operator (or other member of the dev team) carries out, e.g., to begin, stop, supervise, and debug the system. The one of front ends 125 can provide the definition 155 to the back end 130. The back end 130 may process the definition 155, for example, developing an execution plan and using one or more of various databases (e.g., metrics database to name one example) as described in more detail below of the back end 130. The definition 155 may be then provided to and processed, e.g., by the agent 140. An alert and/or result 160 that may result from the execution of the definition 155 can be provided to the computing device 110.

In other embodiments, existing run books are not utilized so instead of converting existing run books to pipelined command steps in a pipeline language, the pipeline command steps are created in the pipeline language for the procedures in lieu of run books.

Figure 2:
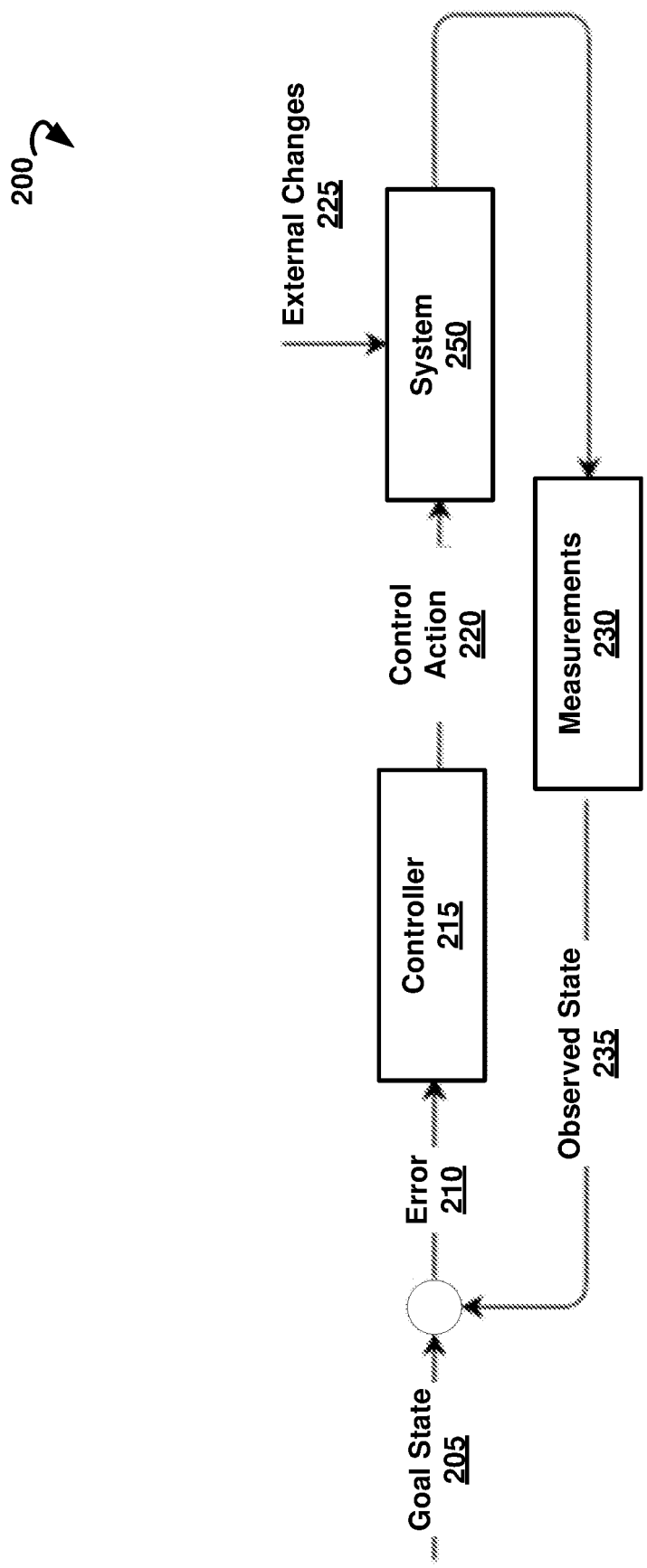
FIG. 2 is a schematic diagram illustrating a measure-alert-act loop for automated remediation, according to an example embodiment.

FIG. 2 is a schematic diagram 200 illustrating a measure-alert-act loop for a process of measuring system performance, identifying errors, and performing automatic remediation, according to an example embodiment. Conventional processes for monitoring system performance typically involve a human operator. In particular, existing tools can be used to measure system performance and identify errors, but require a human operator to maintain control. However, manual decision is prone to introducing errors.

Furthermore, there may be a considerable lag from when an issue is observed in a system under control to when a control action is taken. The practice of continuous integration (CI) combined with continuous deployment (CD), also referred to as CI/CD, had been introduced for software development to try to identify issues earlier. Continuous integration can be considered a practice of frequently integrating new or changed code with the existing code repository. This integration should occur frequently enough that no intervening window remains between commit and build, and such that no errors can arise without developers noticing them and correcting them immediately. Continuous deployment is an engineering approach wherein software functionalities may be delivered frequently through automated deployment, to earlier catch issues that may arise during the deployment phase. Tests may go into a pipeline and execute before CD to ready the software before it goes into a deployed environment, after which some regression tests are typically run against it. This had been a manual process which was very painful since a list of unrepaired, unremediated issues could grow, causing a rate limiter to innovation. CI/CD has helped, however, a new rate limiter is that not just products are being delivered but services are also being delivered. This can cause issues where code associated with service is not ready to go into a production environment but is nonetheless turned over to a deployment team. As a result, there can be half of the tickets for issue arising because of the deployment failure, or an issue during deployment, because the complexities of deployment were not properly considered.

So a new innovation beyond CI/CD is needed, for instance, where it is needed to take the deployment artifact, and then run it on a canary workload, see that it is working, then run it on a limited set of hosts across particular regions, see that it is working there, and then just expand the deployment. Regarding the canary workload, in software testing, a canary workload (also called a canary release or test) is a go-live strategy in which a new application version is released to a small subset of production servers and heavily monitored to determine whether behavior is as expected. If everything seems stable, the new version is rolled out to the entire production environment.

For the deployment calendar automated roll back and metrics etc. can be monitored. The above is mostly the operator view of the continuous deployment type of production deployment. After an automated deployment via continuous deployment various failures can happen in the environment, by way of non-limiting examples there may be a disk failure, a Java virtual machine (JVM) may run out of memory, Python crashes, database conflicts, etc. which need to be fixed.

System administrators or operators may be tasked to repair or remediate the failures and such personnel typically generate run books containing procedures to deal with such failures. Each run book can be a compilation of routine procedures and operations that the system administrator or operator (or other member of the dev team) carries out, e.g., to begin, stop, supervise, and debug a system. Using the known manual approach the system administrator would characterize a failure and then associate it with a particular run book, and then manually run that run book. For simplicity, system administrators will be referred to regarding running the run book, it should be appreciated that others in other roles in the team may do the running.

In various embodiments of the present technology, instead a language is provided that lets the system administrator run on any of their hosts in the portable way, and execute their run book, and get a result, and do that across all your hosts. It basically follows an if-this-than-that approach which may include monitoring the system, characterizing the desired state and observing the current state, the characterizing including characterizing the degree that the observed state is variant from desired state, determine if action is needed to bring the observed closer to the desired, and then automatically performing that action and using feedback control, see e.g. FIG. 2. Feedback control can be applied across an entire fleet, e.g., of network assets.

In some embodiments, existing run books are not utilized so instead of converting existing run books to pipelined command steps in a pipeline language, the pipeline command steps are created in the pipeline language for the procedures in lieu of run books. (Further details and examples concerning fault-tolerant pipeline command sequence execution can be found in U.S. patent application Ser. No. 16/684,0001, filed Nov. 14, 2019 entitled "Fault-tolerant execution of command pipeline steps", which is incorporated by reference herein in its entirety.) An example for the pipeline language would basically express for instance check the CPU, check the available memory in this JVM, assert memory is greater than 20%, otherwise raise insufficient memory (e.g. as an issue). Then there can be a process whereby if there is insufficient memory, run bounce JVM.

An alert that may be generated can signify not that something went wrong, but rather that something is not right. There can be a limited number of ways in which something can be made right. For example, there might be a lot of different reasons why there is insufficient disk space, irrespective of the reason, all that is going to be done is to clear up the temp space on the disk, or grow their disk, two choices. So it does not matter that it is coming through a patch workflow that was trying to deploy something, or it was an excess of logs that cause the insufficiency since there are only a handful of things that can be done to address the issue. The system may do all of the handful of things and return the system back to the user. So there was something that was not what the user wants it to be, and something is determined that deals with how to bring it closer to what they want it to be. The goal would be to have the problem remediated quickly, but also robustly so it is not going to fail again, e.g., when more memories are brought up.

For the operator, the primary concern is typically maintaining system uptime or availability, reliability, decent response times and all the rest of it. So there may be some memory leak inside the JVM, under the manual approach, it needs to be registered with the dev team and have them go figure out what it is which could e.g., take a month or two months, etc. However, it could take they can take a month to do that, or two months to do that. Some failures can occur in the system on an everyday basis, and not adversely impact the customer. So, there can be in essence two modalities at work.

Once one has dealt with things that happen that high frequency, one has a number of things that are happening at low frequency per customer, but maybe are relatively frequent across all customers. Thus, it advantageous to have the observability across all customers, so that even those individually rare, but otherwise common issues get dealt with. It can be a way of aggregating an issue. In some instances, another person can run into an issue at their company, and it gets automatically inherited. It is advantageous therefore to have observability across all or a large portion of the customers for automatically addressing issues that were inherited from other systems. This would be a remediation of an issue that may have been generated across multiple customer environments and so it is desirable to develop an understanding of the correlation and causality response to ascertain what is causing the difference (variance indicative of an error issue).

Operational data can be one of the larger sets of the data sets that are available if that data is collected across many customers. One example way to do that is by collecting event occurrences across many customers.

In various embodiments, there is control over metrics which are measured and which action can be taken. In various embodiments, there is an entire operational language can be directed to do that, along with the backend metrics and execution systems. Examples of how these are used are described in further detail as part of the following description.

As used herein, the system under control is a system of a customer that needs to be monitored and controlled. An example system under control may include an enterprise system, a system of a plurality of computing devices, a cloud system, a web-based system, a cloud-based system, and so forth. In general, currently used approaches are more reactive than proactive, with control actions happening once a system is already impaired. Moreover, current actions are often taken per-instance rather than fleetwide (i.e., across a fleet of customer computers).

As shown in FIG. 2, a goal state 205 of the system under control shown as a system 250 can be monitored and an error 210 reported to a controller 215. The controller 215 may be responsible for automatically taking a control action 220 to mitigate the error 210. Therefore, the control action 220 can be automatically applied with respect to the system 250. In particular, external changes 225 can be applied to the system 250, for example, by changing parameters of the system 250. Upon taking the control action 220, measurements 230 associated with the system 250 can be determined, e.g., by measuring parameters of the system 250. Based on the measurements 230, an observed state 235 of the system 250 can be determined. The observed state 235 can be automatically compared to the goal state 205 to determine whether any further errors exist and whether any further control actions are needed. Thus, the controller 215 can automatically respond to any errors in the goal state by taking control actions with no human operator being needed to maintain the control of the system 250.

Having automated control, as in various embodiments, provides for quicker reaction time. Automated control also can take continuous, small actions rather than the risky manual less frequent actions that can be larger and have adverse consequences. The automated remediation incorporates feedback, acts before the system is awry, which then frees a customer's operators to focus on finding root causes for the errors. This can result in less operator fatigue. In addition, for various embodiments the costs can scale sublinearly with fleet size due to automation.

Various embodiments simplify the process of creating automated remediations (e.g., measure-alert-act loop). The customer can define (in a definition), what they want run as though it were on a single machine. In various embodiments, simple pipelined execution is provided, with operations written as native, Shell, Python, etc. Further details of the pipeline command sequence execution can be found in U.S. patent application Ser. No. 16/696,626 entitled "Executing a pipeline command sequence designed for execution on a single node across a fleet of nodes", which is incorporated by reference herein in its entirety. These pipeline command sequences can be converted into fleet-wide parallel, distributed, fault-tolerant, event-driven, scalable, secure, and automated flows. These flows can be run across thousands or millions of managed resources. Code, libraries, runtime executables can be distributed to nodes as needed. The example method monitors the customers systems and determines when things are different than the desired state, and takes action accordingly. Among the undesired states handled by various embodiments are failures, missing network messages, out of order delivery, changing definitions, additions/removals from fleet, to name just some of the example undesired states. The method according to example embodiments also predictively fixes issues based on rate of metric change. The automated nature with governance helps avoid so called fat-finger issues associated with manual control.

An example model for implementation of the automatic remediation paradigm can include monitoring and alerting as part of the solution, with action being provided at a charge per core-hour. Availability and latency can be provided for popular cloud platforms and API companies without charge for some embodiments, with charges incurred for service availability/latency measurement.

After deployment, failures can happen due to many reasons. In the prior manual way of remediation, an operator would generate a run book that compiled routine procedures and operations that the operator would manually run depending on the failure mode. A failure would be manually characterized to be associated with procedure/operation in the run book which would be manually executed. In various embodiments, the automated remediation method provides a language to the operator that lets them automatically execute the appropriate run book procedure/operation on any of their hosts (e.g., in a portable way) and get a result automatically. This automated remediation can be done across the entire fleet of hosts automatically.

Turning again to FIG. 2, the methods and systems of the present disclosure provide an automated controller for monitoring system performance and automatically remediation/repair of issues. (e.g., measure-alert-act control loop).

In various embodiments, the methods and systems have control over the data gathering instead of in other methods and systems which have a different entity generate the data and provide the data to the methods and systems. Rather than relying on getting data from another party, various embodiments gather the data themselves. Various embodiments have unique advantages by gathering the data and controlling which metrics to measure, and which actions to take. An entire operational language can be provided to do this and the backend metrics and execution systems. Models can be built on top of aspects of methods and systems of various embodiments including data gathered, metrics measured, and actions taken.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

Each of the front end modules shown as front ends 125 in FIG. 1 can be configured to receive definitions from a customer. Each definition may be from a run book provide by a customer, the run book including a detailed description of the actions assigned to each remediation. Definitions may be converted into one or more pipeline steps as described further herein. Alternatively in other embodiments existing run books are not utilized so instead of converting existing run books to pipelined command steps in a pipeline language, the pipeline command steps are created in the pipeline language for the procedures.

In various embodiments, an example method also includes automatically converting each definition of the one or more definitions of the actions associated with each remediation into automated flows in a pipeline language for pipelined execution across the network. Further detail regarding execution of pipelined steps can be found in U.S. patent application Ser. No. 16/696,626 entitled "Executing a pipeline command sequence designed for execution on a single node across a fleet of nodes", which is incorporated by reference herein in its entirety.

Figure 3:
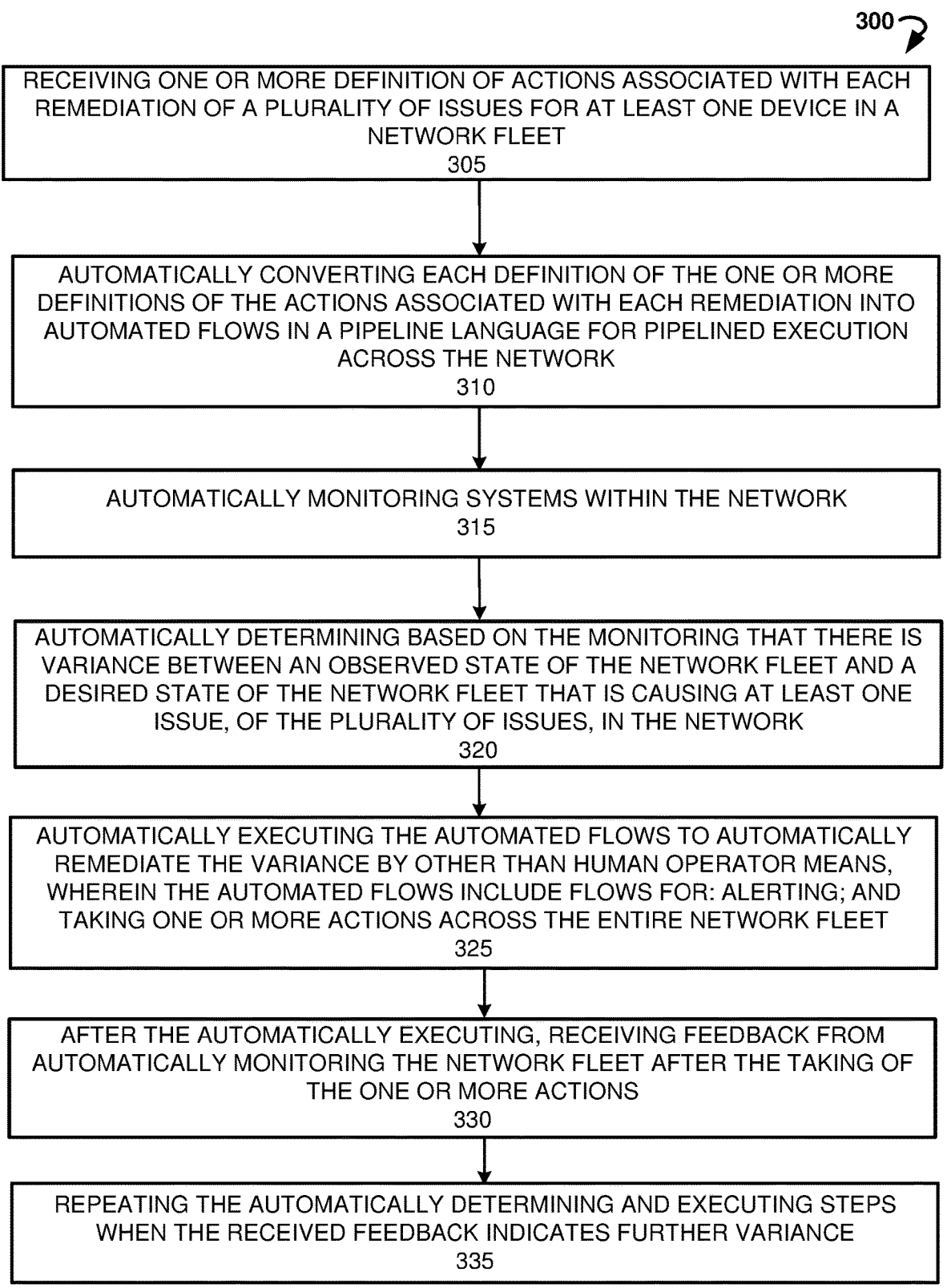
FIG. 3 is a flow diagram showing a method for automated remediation and repair for networked environments, according to an example embodiment.

FIG. 3 is a simplified flow diagram (flow chart) of a method 300, according to an example embodiment.

Operation 305 includes receiving one or more definition of actions associated with each remediation of a plurality of issues for at least one device in a network fleet, as described further herein.

In the example in FIG. 3, operation 310 includes automatically converting each definition of the one or more definitions of the actions associated with each remediation into automated flows in a pipeline language for pipelined execution across the network, as described further herein.

Operation 315 includes automatically monitoring systems within the network, as described further herein.

Turning to the next operation in this example, operation 320 includes automatically determining based on the monitoring that there is variance between an observed state of the network fleet and a desired state of the network fleet that is causing at least one issue, of the plurality of issues, in the network, as described further herein.

Operation 325 includes automatically executing the automated flows to automatically remediate the variance by other than human operator means, wherein the automated flows include flows for: Alerting; and taking one or more actions across the entire network fleet, as described further herein.

Operation 330 includes after the automatically executing, receiving feedback from automatically monitoring the network fleet after the taking of the one or more actions, as described further herein.

Operation 335 uses the feedback in this example and includes repeating the automatically determining and automatically executing steps when the received feedback indicates further variance. In some embodiments, the received feedback may indicate other issues that need to be remediated as part of the feedback loop.

Figure 4:
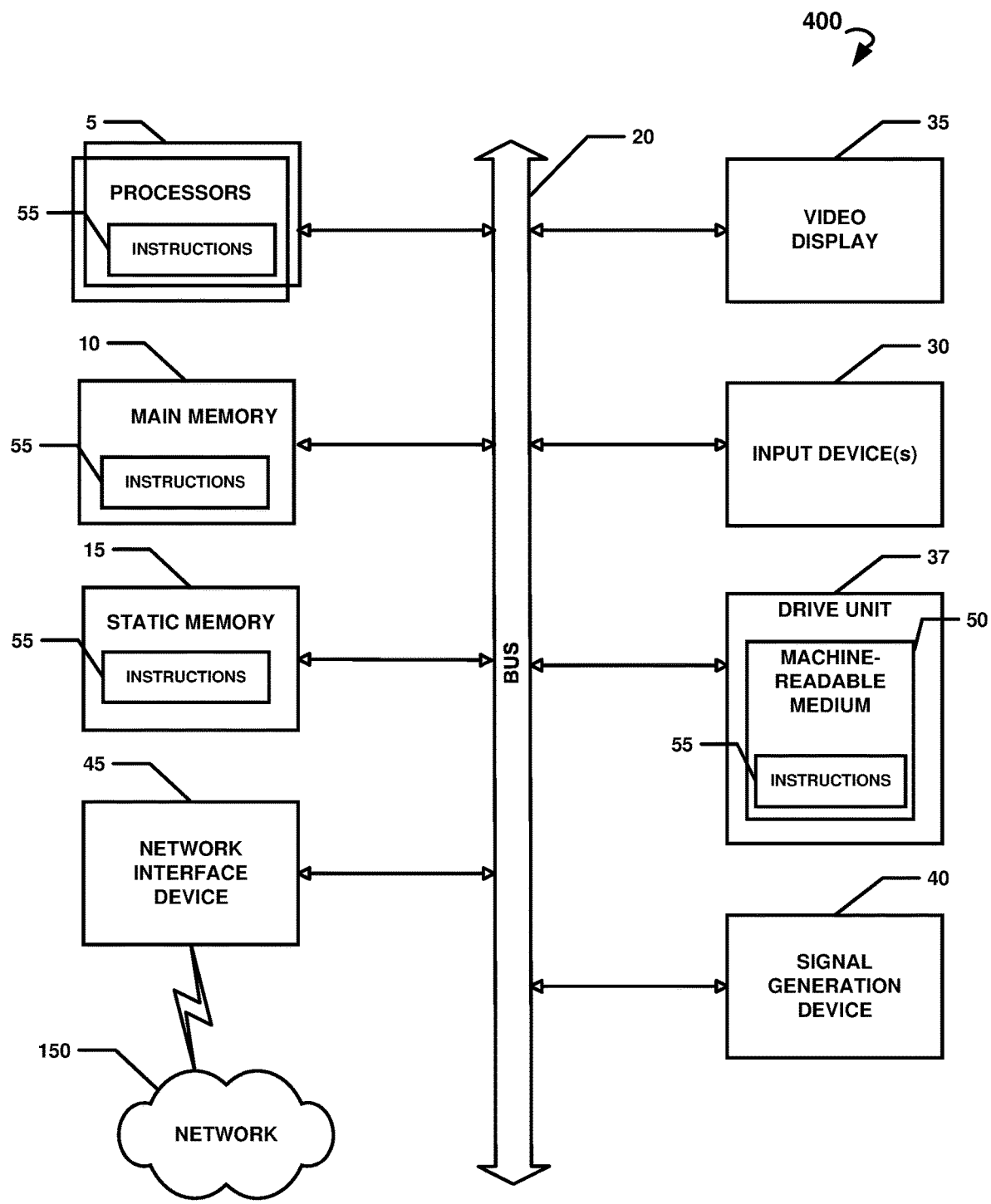
FIG. 4 is a schematic diagram of a computing system that is used to implement embodiments according to the present technology.

FIG. 4 is a diagrammatic representation of an example machine in the form of a computer system 400, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 400 includes a processor or multiple processor(s) 5 (e.g., a CPU, a graphics processing unit (GPU), or both), and a main memory 10 and static memory 15, which communicate with each other via a bus 20. The computer system 400 may further include a video display 35 (e.g., a liquid crystal display (LCD)). The computer system 400 may also include input device(s) 30 (also referred to as alpha-numeric input device(s), e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 400 may further include a data encryption module (not shown) to encrypt data.

The drive unit 37 includes a machine-readable medium 50 (which may be a computer readable medium) on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 400. The main memory 10 and the processor(s) 5 may also constitute machine-readable media.

The instructions 55 may further be transmitted or received over a network (e.g., network 150, see FIG. 1) via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for performing automated remediation for networked environments, the method comprising:
  receiving one or more definitions of actions associated with each remediation of a plurality of issues for at least one node in a network fleet of a plurality of nodes, the network fleet being associated with a network;
  automatically converting each definition of the one or more definitions of the actions associated with each remediation into automated flows in a pipeline language for pipelined execution across the network;
  automatically monitoring systems within the network;
  automatically determining based on the monitoring that there is variance between an observed state of the network fleet and a desired state of the network fleet that is causing at least one issue of the plurality of issues, in the network, the at least one issue being associated with one or more nodes of the plurality of nodes of the network fleet;
  automatically executing the automated flows to automatically remediate the variance by other than human operator means, wherein the automated flows include flows for:
    alerting; and
    taking one or more actions across the network fleet, the taking the one or more actions including executing a plurality of tasks to resolve the at least one issue associated with the one or more nodes, the plurality of tasks being executed in parallel on a subset of available nodes selected from the plurality of nodes as available for the execution; and
  after the automatically executing, receiving feedback from automatically monitoring the network fleet after the taking of the one or more actions.

2. The method of claim 1, further comprising repeating the automatically determining and automatically executing steps when the received feedback indicates a presence of at least one further issue.

3. The method of claim 1, wherein each definition is from a run book provided by a customer, the run book including a detailed description of the actions assigned to each remediation.

4. The method of claim 1, wherein the automatic remediation is performed across the entire network fleet.

5. The method of claim 4, wherein the automatic remediation is performed in parallel across the network fleet.

6. The method of claim 1, wherein the automatic remediation is distributed such that code, libraries, and runtime modules are distributed to nodes of the network fleet as necessary for automatically executing the automated flows.

7. The method of claim 1, wherein the automatic remediation is performed in a fault tolerant manner.

8. The method of claim 1, wherein the variance is caused by one or more failures, missing network messages, out of order delivery, changing configurations, additions or removals of one or more devices from the network fleet.

9. The method of claim 1, further comprising predictively remediating based on a rate of change of measured metrics.

10. The method of claim 1, wherein the one or more actions include continuous, small actions.

11. The method of claim 1, wherein the taking of the one or more actions across the entire network fleet includes determining that a root cause of the variance applies to two or more nodes of the at least one node.

12. The method of claim 1, wherein the automatically converting comprises:
translating a pipeline command sequence into the automated flows for parallel execution on available resources in the network;
determining, based on a type of the pipeline command sequence, the subset of available nodes for optimal execution of the pipeline command sequence across the network fleet;
defining the plurality of tasks for the subset of available nodes;
translating the pipeline command sequence into the plurality of tasks; and
executing the plurality of tasks on the subset of available nodes.

13. The method of claim 12, wherein the plurality of tasks include one or more of the following: providing a resource parameter, providing a new version of software, converting the pipeline command sequence into a native shell script, distributing a code artifact, distributing a runtime version, and distributing a library.

14. The method of claim 13, wherein the native shell script includes a Shell or Python.

15. The method of claim 1, wherein at least some of the received feedback indicates a failure, the failure being automatically remediated by repeating a measure-alert-act loop until the failure has been remediated.

16. A system for performing automated remediation for networked environments, the system comprising:
a processor; and
a memory, the processor executing instructions stored in the memory to:
receive one or more definitions of actions associated with each remediation of a plurality of issues for at least one node in a network fleet of a plurality of nodes, the network fleet being associated with a network;
automatically convert each definition of the one or more definitions of the actions associated with each remediation into automated flows in a pipeline language for pipelined execution across the network;
automatically monitor systems within the network;
automatically determine based on the monitoring that there is variance between an observed state of the network fleet and a desired state of the network fleet that is causing at least one issue of the plurality of issues, in the network, the at least one issue being associated with one or more nodes of the plurality of nodes of the network fleet;
automatically execute the automated flows to automatically remediate the variance by other than human operator means, wherein the automated flows include flows for:
alerting; and
taking one or more actions across the network fleet, the taking the one or more actions including executing a plurality of tasks to resolve the at least one issue associated with the one or more nodes, the plurality of tasks being executed in parallel on a subset of available nodes selected from the plurality of nodes as available for the execution;
after the automatically execute, receive feedback from automatically monitoring the network fleet after the taking of the one or more actions; and
automatically repeat the automatically determine and automatically execute steps when the received feedback indicates a presence of at least one further issue.

17. The system of claim 16, wherein each definition is from a run book provided by a customer, the run book including a detailed description of the actions assigned to each remediation.

18. The system of claim 16, wherein the automatic remediation is performed in parallel across the network fleet.

19. A method for performing automated remediation for networked environments, the method comprising:
automatically converting one or more definitions of actions associated with a plurality of remediations into automated flows in a pipeline language for pipelined execution across a network fleet of a plurality of nodes, the network fleet being associated with a network;
automatically monitoring systems within the network;
automatically determining based on the monitoring that there is variance between an observed state of the network fleet and a desired state of the network fleet that is causing at least one issue of a plurality of issues, in the network, the at least one issue being associated with one or more nodes of the plurality of nodes of the network fleet;
automatically executing the automated flows to automatically remediate the variance by other than a human operator, the automatically executing including taking one or more actions across the network fleet, the taking the one or more actions including executing a plurality of tasks to resolve the at least one issue associated with the one or more nodes, the plurality of tasks being executed in parallel on a subset of available nodes selected from the plurality of nodes as available for the execution;
after the automatically executing, receiving feedback from automatically monitoring the network fleet after the taking of the one or more actions; and
based on the feedback indicating further variance, repeating the automatically determining and automatically executing steps.

20. The method of claim 19, wherein the automated flows include flows for alerting and for taking the one or more actions across the network fleet.

* * * * *